US012761958B2

(12) United States Patent
Körner et al.

(10) Patent No.: US 12,761,958 B2
(45) Date of Patent: Oct. 13, 2026

(54) COMPUTER-IMPLEMENTED METHOD AND CORRESPONDING SYSTEMS FOR PROVIDING IMPROVEMENTS FOR A USER INTERFACE CONTROLLING UNIT CONNECTED WITH A WORKFLOW SYSTEM WHILE USER INTERACTION OR DIRECTLY AFTER USER INTERACTION

(71) Applicant: Siemens Aktiengesellschaft, Munich (DE)

(72) Inventors: Christian Körner, Bergen (DE); Manfred Sand, Fürth (DE); Stephan Hühne, Wilhermsdorf (DE); Doruk Tuncel, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 541 days.

(21) Appl. No.: 18/232,503

(22) Filed: Aug. 10, 2023

(65) Prior Publication Data

US 2025/0053450 A1 Feb. 13, 2025

(51) Int. Cl.
*G06F 9/50* (2006.01)

(52) U.S. Cl.
CPC .................................. *G06F 9/5027* (2013.01)

(58) Field of Classification Search
CPC .... G06F 9/5027; G06F 3/048; G06F 11/3438; G06F 11/3409
See application file for complete search history.

(56) References Cited

U.S. PATENT DOCUMENTS

| | | | | |
|---|---|---|---|---|
| 10,140,199 B1 * | 11/2018 | Rugel | G06Q 30/0627 |
| 11,429,794 B2 * | 8/2022 | Coffing | G06V 40/20 |
| 2010/0058313 A1 * | 3/2010 | Hansmann | G06F 11/3409 706/48 |
| 2016/0063993 A1 * | 3/2016 | Dolan | G06N 20/00 704/254 |
| 2020/0110647 A1 * | 4/2020 | Souche | G06F 11/0709 |
| 2021/0133239 A1 * | 5/2021 | Brochu | G06N 5/04 |

OTHER PUBLICATIONS

Wikipedia: Internet BOT https://en.wikipedia.org/wiki/Internet_bot; 2023.

* cited by examiner

*Primary Examiner* — Peng Ke
(74) *Attorney, Agent, or Firm* — Schmeiser Olsen PLLC

(57) ABSTRACT

A user interface controlling unit is disclosed connected with a workflow system within a multi-user system while user interaction or directly after user interaction, comprising: gathering data concerning resource usage in the workflow system caused by the user interface controlling unit by the user interaction, measuring the effect of the user interaction regarding resource usage in the workflows system, whereby underlying command of the user interaction controls current work step in the workflow system and/or initiates the subsequent work step in the workflow system, assessing at least technical quality of the workflow system's resource usage depending on the measured effect compared with predefined requirement and/or brought about workflow simulation, providing a recommendation for improving implementation of the workflow presentation which is transformed into redesign and/or reconfiguration of the user interface controlling unit, whereby the recommendation is derived from the gathered data and from the assessed technical quality.

13 Claims, 3 Drawing Sheets

COMPUTER-IMPLEMENTED METHOD AND CORRESPONDING SYSTEMS FOR PROVIDING IMPROVEMENTS FOR A USER INTERFACE CONTROLLING UNIT CONNECTED WITH A WORKFLOW SYSTEM WHILE USER INTERACTION OR DIRECTLY AFTER USER INTERACTION

FIELD OF TECHNOLOGY

The present invention relates to a computer-implemented method and corresponding systems for providing/recommending improvements for a user interface controlling unit connected with a workflow system within a multi-user system while user interaction or directly after user interaction.

BACKGROUND

These are just a few examples of controls available in user interfaces (UI). The use of these controls can vary depending on the design of the interface and the specific needs of the application.

There are some standard controls (controlling units) for UI paradigm. For example:

Graphical User Interface (GUI) paradigm:

1. Buttons: A button is a control that triggers an action when clicked or tapped. It can be used for actions such as submitting a form, saving changes, or navigating to a new screen.
2. Text boxes: A text box is a control that allows the user to input text, such as their name or address. It can be used for a variety of purposes, including search fields, log-in forms, and messaging apps.
3. Checkboxes: A checkbox is a control that allows the user to select one or more options from a list. It can be used for tasks such as selecting items from a list, toggling settings on or off, and filtering search results.
4. Radio buttons: A radio button is a control that allows the user to select one option from a list. It can be used for tasks such as selecting a payment method or choosing a language.
5. Drop-down menus: A drop-down menu is a control that displays a list of options when clicked or tapped. It can be used for tasks such as selecting a country, language, or category.
6. Sliders: A slider is a control that allows the user to adjust a value by dragging a slider handle along a track. It can be used for tasks such as adjusting volume, brightness, or contrast.
7. Progress bars: A progress bar is a control that indicates the progress of a task, such as file download or installation.
8. Tooltips: A tooltip is a small box that appears when the user hovers over an interface control, providing additional information or context.

Touch-First Paradigm:

1. Touch Targets: Touch targets are areas on the screen that users can tap to trigger an action. They can vary in size, shape, and location and are often used for navigation, interaction, and selection.
2. Gestures: Gestures are touch-based actions that involve swiping, pinching, tapping, and holding. Gestures can be used for tasks such as scrolling, zooming, rotating, and selecting.
3. Sliders: Sliders are touch-based controls that allow users to adjust values by dragging a slider handle along a track. They can be used for tasks such as adjusting volume, brightness, or contrast.
4. Buttons: Buttons in the touch-first paradigm are similar to those in the GUI paradigm, but may be larger and have more prominent visual cues to indicate their interactivity.
5. Text entry: Text entry on touch screens typically involves an on-screen keyboard that users can tap to enter text. Auto-complete, spell-check, and voice-to-text features can also be used to improve text entry.
6. Swipe Menus: Swipe menus are menus that can be accessed by swiping from the edge of the screen, often used for quick access to app settings, notifications, and other features.
7. Haptic Feedback: Haptic feedback is tactile feedback that is provided through the touch screen, such as a vibration or haptic sound, to indicate when a button or control has been activated.
8. Voice-based Controls: Voice-based controls are becoming increasingly popular in touch-first interfaces, allowing users to interact with devices using natural language commands and voice assistants.

Haptic Paradigm Interfaces:

1. Tactile buttons: Tactile buttons are physical buttons that provide tactile feedback when pressed. They can be used for navigation, interaction, and selection.
2. Tactile sliders: Tactile sliders are physical sliders that allow users to adjust values by sliding a button along a track. They can be used for tasks such as adjusting volume, brightness, or contrast.
3. Haptic feedback: Haptic feedback is the use of vibration or other tactile sensations to provide feedback to the user. Haptic feedback can be used to confirm actions, provide feedback on button presses, and provide cues for navigation.
4. Pressure-sensitive controls: Pressure-sensitive controls are controls that respond to varying levels of pressure applied by the user. They can be used for tasks such as adjusting the intensity of a sound or the speed of a movement.
5. Tactile displays: Tactile displays use physical actuators to create tangible feedback for the user. They can be used to display shapes, textures, and other physical sensations.
6. Voice-based controls: Voice-based controls are becoming increasingly popular in haptic interfaces, allowing users to interact with devices using natural language commands and voice assistants.
7. Motion-based controls: Motion-based controls use sensors to detect movements and gestures, allowing users to interact with devices by moving them or making gestures in the air.

Existing approaches to balance user requirements regarding the design of the UI and tasks with respect to value (v) in the sense of technical quality, functionality, sustainability, accessibility, security, time etc. and/or with respect to costs (c) with the meaning of resource usage like bandwidth, CPU load and storage usage, exhaustion, reactivity, errors, and necessary rework rely on different definitions. Controls and feedback for user interaction commands with effects for a system, in particular a workflow system, is missing.

In view of this, it is an objective of the present invention to present an improved concept or method or system that allows for an efficient quality and performance measurement for a user interface controlling unit connected with a workflow system while user interaction or directly after user interaction.

SUMMARY

The above-mentioned objective is achieved by a method and one or more apparatus and/or a system and/or a device according to the features of the independent claims.

Preferred embodiments of the invention are described in the dependent claims. Any combination of the features of the dependent claims to each other and with the features of the independent claims is possible.

An aspect of the invention is a recommender system suitable for computer-implemented recommending improvements for at least one user interface controlling unit connected with a workflow system within a multi-user system during user interaction or directly after user interaction, which preferably comprises at least one processor which is configured to:

- gathering data concerning resource usage in the workflow system caused by the user interface controlling unit by the user interaction,
- measuring the effect of the user interaction regarding resource usage in the workflows system, whereby underlying command of the user interaction controls current work step in the workflow system and/or initiates the subsequent work step in the workflow system,
- assessing technical quality of the workflow system's resource usage depending on the measured effect compared with at least one predefined requirement and/or brought about workflow simulation,
- outputting one least one recommendation for improving implementation of the workflow presentation which leads to a recommended redesign and/or reconfiguration of the at least one user interface controlling unit, whereby the at least one recommendation is derived from the gathered data and from the assessed technical quality.

The gathered data can include the resource usage in the workflow system and concern/comprise data of further resource usage within the distributed system. So both kind of resource usage should be measured. Measured effects are assessed depending on predefined requirements which can be calculated or set by the user, and maybe by a bot (https://en.wikipedia.org/wiki/Internet bot).

Workflow simulation with the gathered data in order to assess technical quality and/or to predict system behaviour in particular behaviour in the workflow system can be integrated into the recommender system or outside the workflow system within the multi-user system.

Technical quality consideration for user and system and thereby cost and value is integrated directly during/after user interaction with the workflow system. User interface controlling units are the technical realization of the user interfaces paradigm. Usually, the user controlling units are part of a user interface within a multi-user system. Workflow presentations are usually shown on a screen/display of the user interface.

In this context (re-)configuration means: There are parameters in the user controlling users. For instance: A check box of a set of check boxes that can be place in another order. Normally, the paradigm is not changed.

In this context (re-)design means: The paradigm is change. For instance: Text boxes are changed to check boxes. If the variety of possible inputs are reduced the load of the system and therefore the resource usage can be reduced.

The resource usage (costs) and technical quality (value) considerations can be integrated into many paradigms but the controlling units—their technical implementation—need to be adapted/improved.

Controlling units react and cost transparent commands at systems follow after a user interaction. Feedback the measured effect can be designed as voting and such voting can be considered along with the assessed technical quality. Voting is used to improve system resource usage, value model and user satisfaction. Users are presented with the costs of commands and get to vote for the quality of the result based on an agreed value model.

An embodiment of the invention can be a machine learning system connected to the recommender system which can be feeded via the gathered data and via the assessed technical quality in order to conclude/predict behaviour of the workflow system and to provide configuration data for redesigning and/or reconfiguring of the at least one user interface controlling unit which fits to the concluded behaviour.

A benefit of the invention is:

1. Systems are designed around explicit or implicit technical quality models for user and systems quality ensuring the value of the system for user as it is obligatory for creating the user interfaces.
2. Users are empowered to direct the workflow system toward their current needs and express their valuation, which usually is beneficial for user satisfaction.
3. Result and quality requirements and feedback by the users are used to adapt system resource consumption and therefore dynamic value optimization. (IT sustainability, green digital twin).
4. Standard controlling units run on a wide variety of systems providing a similar look and feed to applications.

A further aspect of the invention is a user interface configuration system, preferably comprising at least one processor or to be connected with it/them, for redesigning and/or reconfiguring of at least one user interface controlling unit for a multi-user system, which is adapted and/or configured to receive at least one recommendation for improving implementation of a workflow presentation, whereby the at least one recommendation is transformed into redesign and/or reconfiguration of the at least one user interface controlling unit, whereby the at least one recommendation is derived from gathered data concerning resource usage in the workflow system and/or within the multi user system and from assessed technical quality of the workflow system's resource usage and/or of the multi user system depending on measured effect of the user interaction regarding resource usage in the workflows system and/or within the multi user system compared with at least one predefined requirement and/or brought about workflow simulation.

The user interface configuration system can be coupled/connected to a user interface presenting various views of the recommendation. The processor can stear and/or control and/or load and/or execute method steps of the below mentioned method. The processor can be part of a server or of a runtime environment within the multi-user system.

Redesign and/or refiguration which can be incorporated into a deployment package for the user interface comprising the at least one user interface controlling unit. Such package can be certified to ensure a minimum level of technical quality.

A further aspect of the invention is a multi user system comprising the recommender system and the user interface configuration system which interact with each other. The user interface provides feedback by user interaction to the recommender system regarding the recommended redesign and/or reconfiguration.

A further aspect of the invention is a computer-implemented method for providing improvements for a user interface controlling unit connected with a workflow system within a multi-user system while user interaction or directly after user interaction, comprising the following steps:

gathering data concerning resource usage in the workflow system caused by the user interface controlling unit by the user interaction, measuring the effect of the user interaction regarding resource usage in the workflows system, whereby underlying command of the user interaction controls current work step in the workflow system and/or initiates the subsequent work step in the workflow system, assessing at least technical quality of the workflow system's resource usage depending on the measured effect compared with at least one predefined requirement and/or brought about workflow simulation, providing one least one recommendation for improving implementation of the workflow presentation which is transformed into redesign and/or reconfiguration of the at least one user interface controlling unit, whereby the at least one recommendation is derived from the gathered data and from the assessed technical quality.

The gathered data can also concern data of further resource usage within the distributed system.

Embodiments as described above for the systems can be analogous applied for the method and for computer program (product) and for the computer-readable storage medium.

Systems can be implemented by hardware, firmware and/or software modules or a combination of them.

The computer-readable storage medium stores instructions executable by one or more processors of a computer, wherein execution of the instructions causes the computer system to perform the method. The one or more processors can be distributed organized on servers or in a cloud.

The computer program (product) is executed by one or more processors of a computer and performs the method.

BRIEF DESCRIPTION

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. In the figures, identical or functionally identical elements are denoted by identical reference signs. Included in the drawings are the following figures.

DETAILED DESCRIPTION

Figure 1:
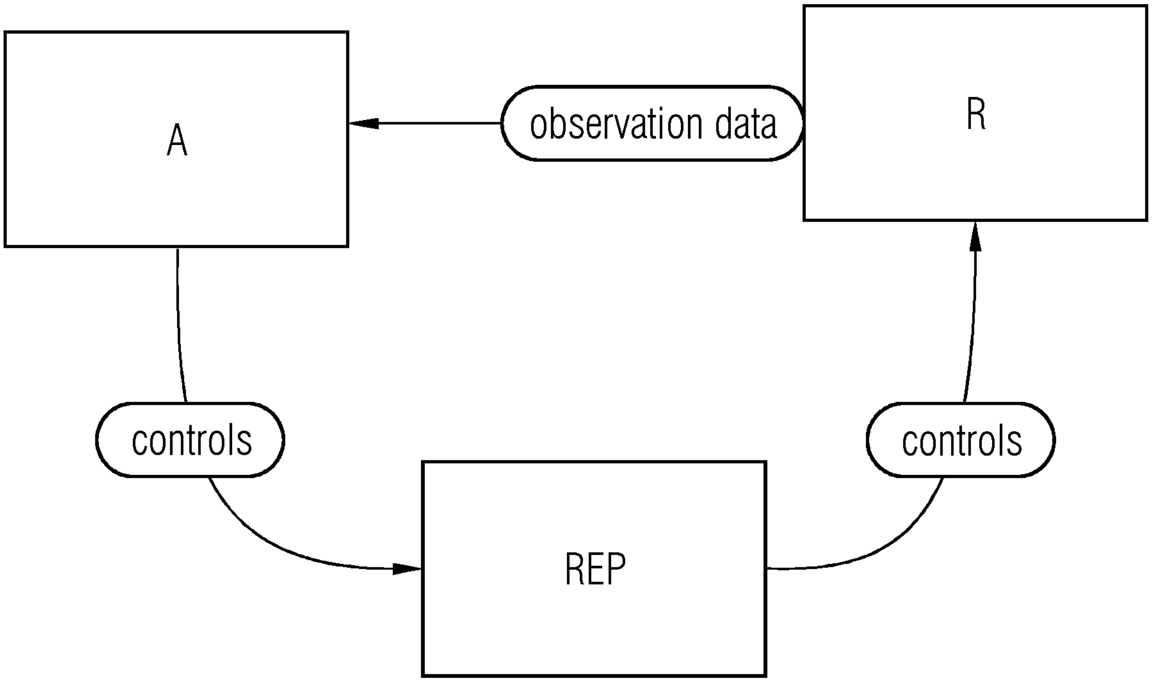
FIG. 1 illustrates an overview of the inventive system.
Figure 2:
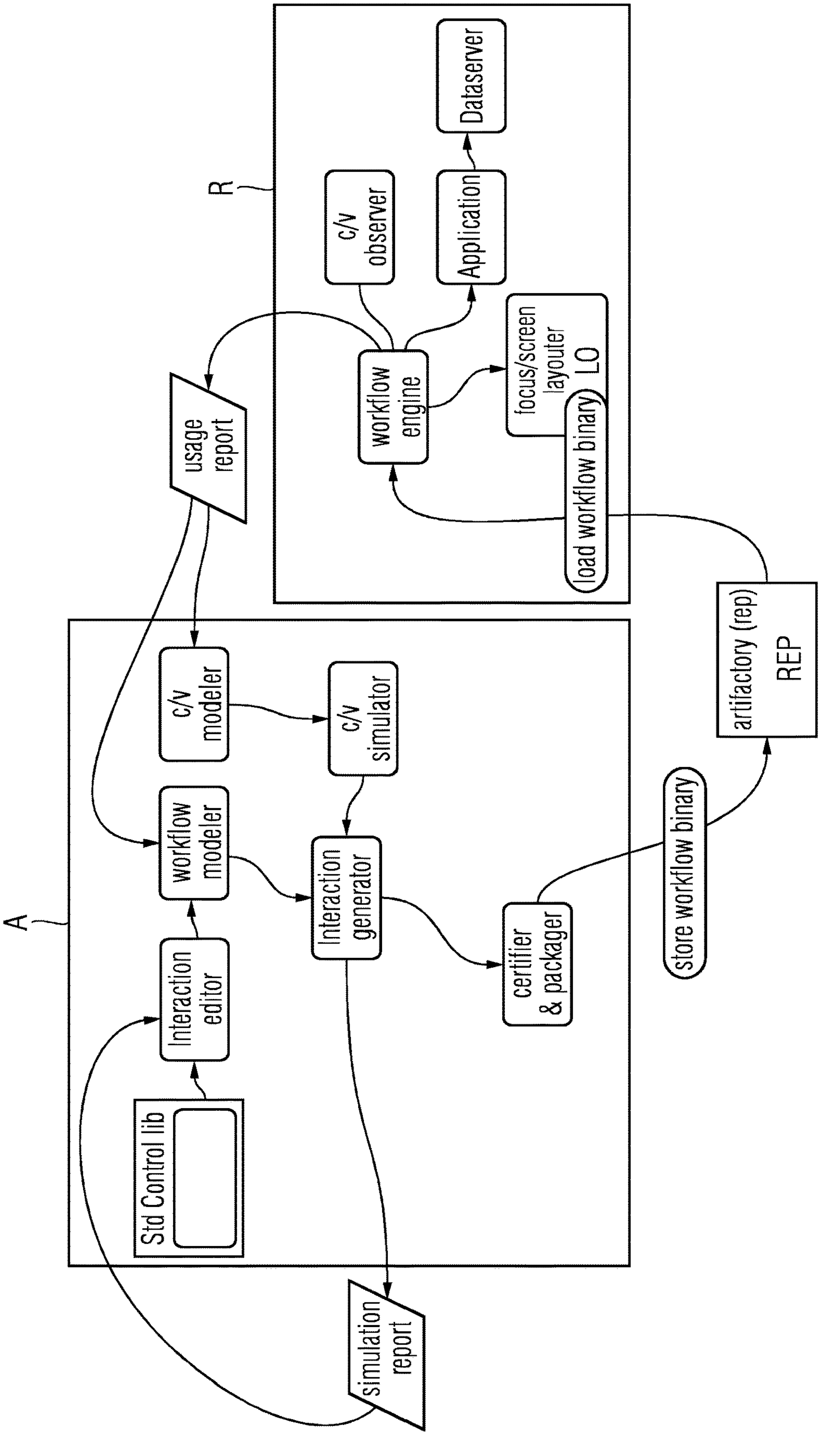
FIG. 2 shows in more detail modules of multi-user system comprising the inventive system, and FIG. 3 a haptic control device.

As shown in FIG. 1 the system comprises the following components und/or modules respectively:

A interface configuration system, for instance, designed as an authoring module A: this module is responsibility to provide, test and certified workflow presentations. Authoring components can be for instance, as shown in FIG. 2, an interaction editor, workflow modeler, quality modeler for system and user quality model, interaction generation, workflow simulator, a standard (std) control library (lib) and a certifier and packager. The standard interface controls (interface controlling unit) can be based on a standard virtual machine, preferably Webassembly.

For requirement of design enhancement, the following example of a template can be used which results in a usage report. The template describes extension of the standard control for cost/value (c/v) observation user related technical qualities and system optimization.

1. <name of interaction>
2. <interaction symbol> with proposed c/v extensions
3. <mental load reduction> that means exhaustion of the user can be reduced. An exhausted user leads to a risk to make errors. This can decrease safety of a system by mistakes of the exhausted user.
4. <system state>
5. < in process feedback>
6. <result feedback >

In the workflow of the authoring system information of the templated can be used for visualizing relevant system states.

Commands potentially triggered through the control can prioritized.

Order information can be received by the system in response to the commands by user preferences. The system state can be shown and follow up commands can lead to reorder. Voting possibility for user to change relevant preference can be integrated and gives feedback to the system.

Above mentioned steps can be repeated for all screens of the workflow where user/system quality information exists (see template above).

Verification by simulation is done whether the designed improvement of user and system quality is sufficient.

Certify the workflow and make available through artifactory REP.

Instead of a template the authoring module can use runtime usage reports (incremental design).

Recommendation for control improvements to fill gaps towards a standard or application define optimization goal for workflow quality and resource usage can be:

based on actual workflow history, based on predictions for workflow distribution.

The authoring module can use simulated data (incremental design)

Recommendation for control improvements to fill gaps towards a standard or application are derived from defined goals like workflow quality and resource usage. Goals can be defined by simulation of workflows based of assumed cost model and system usage.

The authoring system can be extended by a learning system extracting mapping pairs from customized interaction designs. (classification system based on stochastics, machine learning, extended by a large language model for explanations and implementation suggestions.) Behavior of the workflow system can be predicted and configuration data can be presented via the learning system for redesigning and/or reconfiguring of the controls which fit to the predicted behaviour.

A recommender system, for instance, designed as a runtime module R: this module is responsibility to execute the workflow presentation adapted to the current cost and value situation. The cost and value situation can change by the above-mentioned gathered data and the assessment. Adaption/implementation of the workflow presentation can be executed/performed when the provided recommendation is transformed into executable implementation preferably in response to a user confirmation. For instance, an input form by standard interactions based on standardized iconic user controls (GUI), touch gestures, behavioral language or gestures can be adapted.

It can be set up as server or peer to peer system depending on the application resource and storage requirements. Runtime components of the runtime module can be for instance, as shown in FIG. 2: cost and value observer (e.g., server), workflow engine (e.g., server), focus/screen lay outer module for an output device, interface controls, application and optionally a dataserver.

Layouter module LO integrated into or connected with the system which recommends the design and/or configures the usage of control features based on resources and user preferred qualities or resource allowances. Resources can be based on system state. Allowance can be based on user value preferences.

The way of recommending depends on the user interface paradigm supported by the standard controls and implemented by the layouter module. Usually at least one recommendation is output and can be received by the authoring module which can transform the received recommendation into different implementation forms of the interface controls.

The illustrated artifactory REP can be a storage system and/or retrieval system for workflow binaries, which can be loaded into the runtime module. Certified Workflows.: self-contained binaries of known origin and quality standards. Above mentioned assessment and/or certification can be based on simulation (see in the following).

Interactions can trigger commands: search, transaction start—close—cancel, a session init, authentication (e.g., via login), close, leave, issue command (stateless), issue procedure (state change), state display, progress display, browse information, browse cost value. GUI state related to system state e.g., if load is high/low and/or the bandwidth is low/high then the GUI reactivity is high/low.

Example Controls Extensions:

A text control for search interaction can be improved by recommendations for instance like:

- Include control lens with search string
- Cost and value extension lens with result indicator like"single few all", "fast and meager", "slow and fat" etc.
- Improvement regarding ergonomics (reducing user's exhaustion): open c/v controls on long click only. Present the most favored combination first. Depending on system state present favorite c/v combination close to focus and large and decrease size and increase distance accord.
- Real time feedback directly after user interaction: e.g. progress bar of c/v with stop or good enough button. The above-mentioned result feedback (see above 6.) can be implemented as such: —select most favorable—deselect least favorable—browse for better alternative. Resort by reevaluate transmitted results or get others.

Figure 3:
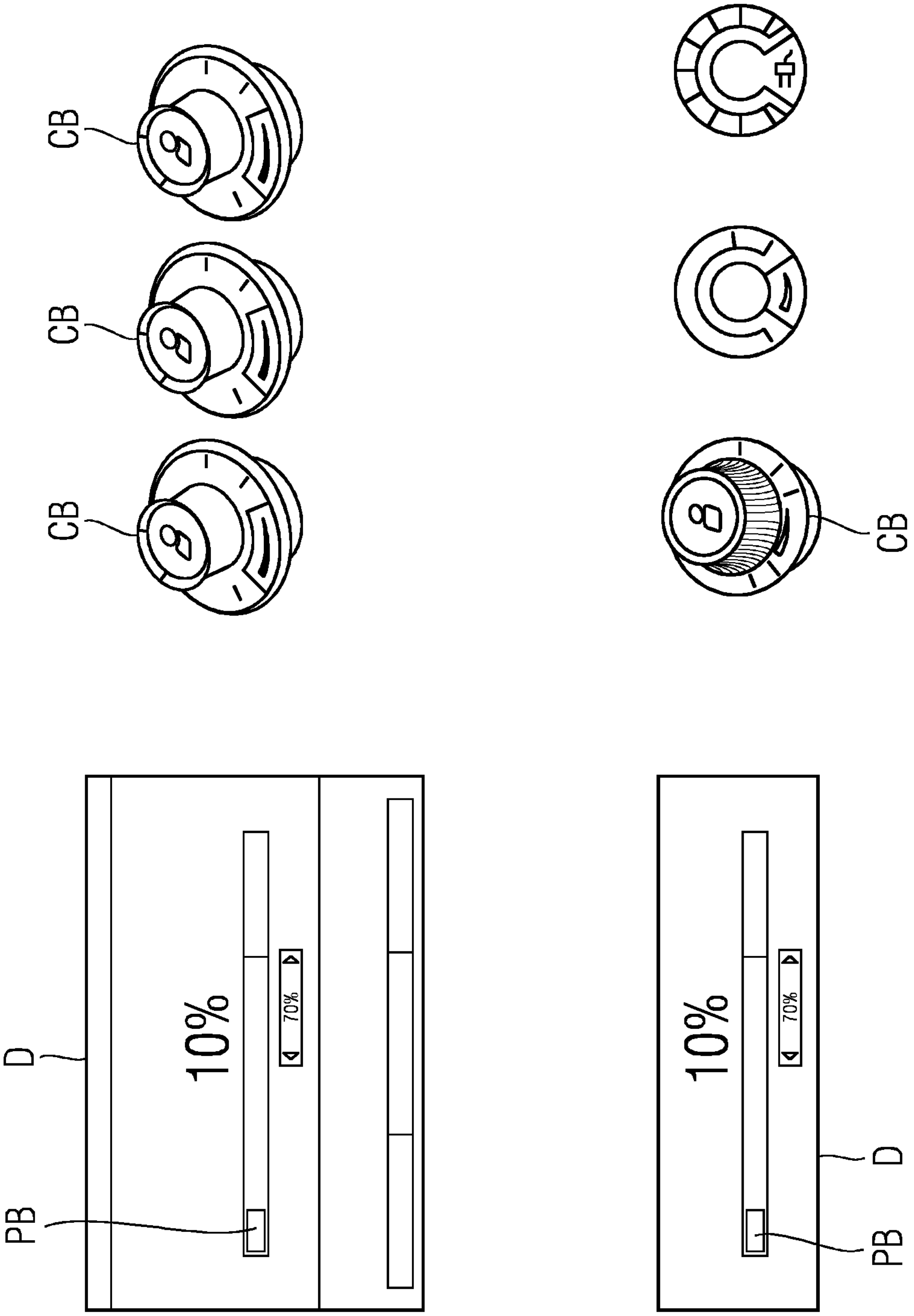

FIG. 3 shows a control bottom CB near to a display D showing a progress bar PB. The underlying paradigm of the interfaces controlling unit behind/of the control bottom is an haptic feedback wherein the use of vibration or other tactile sensations provides feedback to the user. Haptic feedback can be used to confirm actions, provide feedback on button presses, and provide cues for navigation.

To illustrate the uses of enhancements of standard controls subject to this invention we provide 4 scenarios.

1. Alarms in digital factories
2. Charging of electric vehicles.
3. Lifetime monitoring
4. Configuration of machine tools Ad Alarms in Digital Factories Setting is a digital factory which tool machines that need setup and maintenance.

Goal is to maximize the runtime of the tool machines. The workflows we take from the coordination of the mobile experts who troubleshoot and maintain the tool machines. To coordinate the experts there is an alarm system available.

Workflow 1: Register an expert to an alarm.

Workflow 2: Moving around in the factory.

Workflow 3: Acknowledge and alarm by an expert.

The user and system quality models are defined to ensure that experts can move freely in the factory and system knows which expert can be reached (expert mobility and expert availability).

Such setting raises mobility: Use area of reachability. At the borders alert the system and the expert that reachability is changing.

This ensures that the system knows which experts are reachable and alerts the expert not to involuntarily leave areas of reachability.

If the closest really available expert to fix the issues fast is selected, then downtime is reduced.

A mix of haptic and touch first GUI paradigm can be implemented on and wearable device, preferably a smartwatch.

A system health icon can be used.

The amount of reachable and "free" experts can be shown. Progress controls can be shown.

Such progress control is extended to show the reachability status and "distance to the next border".

Vibration indications are possible for indicating critically low available experts and/or leaving area of reachability.

A further progress control is used to register to the system, set alarms for reachability and status. The goal is to enhance mobility and keep the alarms to the necessary limit. Alarms are made dependent to system health.

A benefit for the system is to have real-time data of expert proximity, availability and mappings of alarm/expert pairing.

Expert can give feedback about the issue/task and provides feedback about reachability directly and online. Expert can give an indication if an alarm was fitting and appropriate on the alarm acknowledging button, e.g., short press on the button means "OK". Long press on the button means bad alarm.

This shows how standard controls on a wearable device can be extended to reflect the user and system quality. Further the expert can give feedback to the alarm received by the system. A user interface (UI) can be designed for registration of a maintenance expert to an alarm system, seeking for the part of the machine causing the alarm, acknowledgement by the expert to stop the alarm if troubleshooting/maintenance is done. Predefined requirements can be time threshold in this context. How fast the expert can reach the problem which causes the alarm. Reachability of the expert can be expressed by the signal strength of the respective radio network. The expert sets the limits where he is to be alerted either to move back to an area of higher signal strength or to be listed as unavailable. The system may indicate its preferences based on expert availability and expected alert load. This workflow may be designed with an enhanced button and progress control.

In this case a feedback template (analogous to the above mentioned one) regarding the designed UI should be filled by the expert, e.g., how fast and secure was the registration work step. The value is assessed e.g., via the template results and compared with the predefined requirements. One or more messages containing recommendations can be output which indicate how to improve the user interface controlling unit of the designed UI to accelerate and/or protect the registration work step.

A further example for a workflow scenario could be setting a charging system e.g., charging station for e-mobility. There is an internet connected charging station that can be remotely booked.

A control button is used by turning in order to set the maximum of battery capacity, e.g., Battery is charged to a capacity level of 80%.

Goal is to maximize the amount of distributed energy. Challenge is that charging is efficient at about 30% to 80% of batteries capacity with a well-conditioned (heated) system. Below 30% and above 80% energy is wasted a lot.

Active role is charging customer.

A first workflow 1 can be: Registration for charging

A second Workflow 2 can be: At the charging point

A third Workflow 3: Deregistration from the Charging Station

Workflow 2 can be setup with a pre-selected threshold for the maximum battery capacity e.g., 80%.

The user turns the control button from left to right. On a certain turning point representing the 80% the user gets feedback e.g., by a clicking noise. On the display it is shown the battery charging progress. The charging stops if the threshold is reached. Then the user decides via user interaction to change the threshold e.g., up to 90%. In this example the user interaction is to turn the control bottom more into the right and to stop at a different turning point. During or after this user interaction data concerning resource usage of the charging system are gathered/collected. The effect of the underlying command (charging) of this user interaction is measured. In this example the energy consumption for the current and/or the subsequent work step—in this example charging steps between 80% and 90% —is measured. Optionally, the user is shown a feedback template as described above:

1. Turning the button over the turning point indicating the pre-selected threshold
2. Haptic control button with offered extensions like making it more difficult to turn over this point e.g., more force need to be used, more noise as feedback etc. The user can select one of the offered extension/enhancement options.
3. Indicating the exhaustion of the user caused by the interactions e.g., voting on a scale from 1 to 10.
4. System state: e.g., how much energy was consumed.
5. Progress state while charging between 80% and 90%
6. Result feedback: how content is the user with the user interface for charging (can be also a scale from 1 to 10)

The result data of the measurement are assessed by comparison with pre-defined or pre-calculated requirements. In this example that means comparing energy consumption of the charging between 30% and 80% plus the energy consumption between the 80% and 90% with a pre-defined/calculated maximum of energy consumption in total. The assessment leads to a value representing technical quality.

On the display recommendations which are derived from the gathered data and the assessment can be shown to the user, e.g. changing the progress bar: if the turning point is to much to the right (that means more than 80% battery capacity) then the progress bar change its colour e.g. from green to red. And/Or the turning the button needs more force by the user. Such recommendation can be derived from the feedback template or stored in a database. In the database can be stored historical data like former assessing values and useful changes in the controlling unit and/or display presentation. Such recommendations can be translated into implementation.

An example for user feedback can be:

Overriding the 80% limit and requesting always 100%.

The alternate charging station is ignored which can be reached with more than 30% remaining charge. This would indicate that the user is not in agreement with these system improvements for sustainability.

Workflow 3 focuses on the deregistration/disconnection process from the charging station. While the charging duration increases per percentage as the battery charge gets closer to the battery potential, charging stations incur additional costs for cars that are occupying charging slots at an idle state. This brings in the conflict of "willingness to leave as soon as the battery percentage is full" against "needing to wait extended minutes for that last 1%" By having value enabled controls, the following steps of this workflow can serve both sides (charging station operators and the charging customers" by reducing this last 1% uncertainty before disconnecting from the charging station. User Interface Interaction: Access the user interface display on your electric vehicle's dashboard to initiate the disconnection process from the charging station. Charging Status Overview: Review the real-time charging status including current charge percentage. Given that the charging speed to time function follows a rather uniform distribution within the 30%-80% range, the user will be informed within a more precise timeframe in terms of when to detach the car from the charging system. Instead of currently used uninformative, non-precise progress bars and countdowns, the color output can be prompted in a pulsing manner and can conclude the process with a final color change to provide concrete visual feedback to the customer to ensure the charging process has completed or reached the desired target.

A further example is: Setup and adjustment of the tool machines in a production factory. Operational data of the machines should be linked to lots, a product or several products that should be produced. Such tool machines can be spinning machines or scrubbers or milling machines (e.g., CNC-machines, CNC=computerized numerical control) or pick and place machines in a circuit board production (SMD=surface mounted device).

Goal is to optimize data quality (completeness and accuracy) to assures technical qualities though IT processes like quality control for product and platform, supplier management, operator training or predictive maintenance.

Workflow 1: Material setup

Workflow 2: Tool setup.

Workflow 3: Tool adjustment or replace (calibration).

Especially remote setup and maintenance controllers can be a decisive part in capturing/gathering this valuable data by propagate these to standard IT systems (IT (information technology)—OT (operational technology) connection) to control production processes.

These remote devices carry task or lot specific data context that the real-time microcontrollers of the tool machines are not burdened with. Difficulties at setup of tools and material or calibrations for a specific lot can be captured and used for further planning of production and maintenance.

This information needs to be captured without extra tasks (time spent) or paperwork as this is inacceptable on the shopfloor. The proposed solution is to extend the controls on the remote devices to capture this information on the fly.

As an example, the confirmation of a material- or tool-setup or the completing of a calibration is applied. This is often done by pressing a button and acknowledged by soft sound. To convey a conditional acknowledge a long press could be used with a sharper sound. Subsequently dialog that allows for immediate selection of severity and selection of some predefined cause for the conditional acknowledge is shown. Hereby extra tasks or paperwork is avoided and the information is captured in the relevant data context. Delays and extra work and errors in discovering the data context later are avoided.

As short feedback after the final acknowledge the system could ask how closely the proposed causes fit the situation.

A further scenario could be in the context of mechanical and electronic parts of the system, e.g., machine tools. They have a lifetime in which the system is operational. Mechanical and electronics parts need to be maintained refurbished or replaced. The way of operation however is heavily influencing lifetime of them.

The goal is to reduce the system's load, load changes and power supply if it overshoots the isolators, wires and semiconductors are damaged. This leads to significantly shortened lifetime.

Moderated control of the system and proactive maintenance can extend the lifetime of the system.

A requirement is to achieve a long lifetime with low maintenance activity.

Workflow 1: Moderate control of system.

Workflow 2: Propose proactive maintenance steps.

For workflow 1 a user interface can be designed for reducing the system's load and power supply. For example, a haptically enhanced control button as mentioned above can be used to express the limits of operation for the current maintenance state of the machine. Feedback from the maintainer could be collected either requesting stricter limits next time, suggesting a maintenance activity, or blocking the machine for the currently intended production task.

The invention has been described in detail with reference to embodiments thereof and examples. Variations and modifications are possible. Instead of the above-described production process one or more processes can analogously be applied to other technical systems.

The multi user system and its parts can be (computer-) implemented for performing the inventive method steps.

Parts of the system can be integrated into a (computer) cloud system. It includes one or more processors and can be coupled with data, where said processor(s) is/are configured to execute the method steps.

The method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the systems and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

In addition, and alternatively, it is possible that a control device receives other computer-readable control signals in order to initiate the mentioned steering/control process by its processor(s).

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A recommender system suitable for computer-implemented recommending improvements for a user interface (UI) controlling unit connected with a workflow system within a multi-user system, said recommender system comprising one or more processors configured to perform a method comprising:

gathering data concerning resource usage in the workflow system caused by the UI controlling unit via a user interaction of a user with the UI controlling unit, wherein the UI controlling unit is selected from the group consisting of a specific graphical user interface (GUI) control on a computer screen and a specific physical haptic control;

measuring an effect of the user interaction regarding resource usage in the workflow system, wherein underlying command of the user interaction controls a current work step in the workflow system and/or initiates a subsequent work step in the workflow system; and outputting one least one recommendation for improving implementation of the workflow presentation which leads to a recommended redesign and/or reconfiguration of the UI controlling unit to improve a functional utilization of the UI controlling unit for implementing one or more work steps in the workflow system, wherein the at least one recommendation is derived from the gathered data and from a technical quality of the workflow system's resource usage.

2. The recommender system according to claim 1, wherein the gathered data also concern data of further resource usage within a distributed system.

3. The recommender system according to claim 1, wherein a machine learning system connected to the recommender system which can be fed via the gathered data and via the technical quality in order to conclude behaviour of the workflow system and to provide configuration data for redesigning and/or reconfiguring of the UI controlling unit which fits to the concluded behaviour.

4. The recommender system according to claim 1, wherein the measured effect can be voted by the user to improve the workflow system's resource usage.

5. A user interface configuration system (authoring system) for redesigning and/or reconfiguring of a user interface (UI) controlling unit for a multi-user system, said user interface configuration system comprising one or more processors configured to perform a method comprising:

receiving at least one recommendation for improving implementation of a workflow presentation; and transforming the at least one recommendation into redesign and/or reconfiguration of the (UI) controlling unit to improve a functional utilization of the UI controlling for implementing one or more work steps in a workflow system connected with the UI controlling unit, wherein the UI controlling unit is selected from the group consisting of a specific graphical user interface (GUI) control on a computer screen and a specific physical haptic control, and wherein the at least one recommendation is derived from gathered data concerning resource usage in the workflow system and/or within the multi user system and from a technical quality of the workflow system's resource usage caused by the UI controlling unit via a user interraction of a user with the UI controlling unit.

6. The user interface configuration system according to claim 5, wherein the redesign and/or refiguration can be incoorparated into a deployment package for the UI controlling unit.

7. A multi user system comprising the recommender system according to claim 1 and a user interface configuration system which interact with each other.

8. The multi user system according to claim 7, wherein the UI object provides feedback by user interaction to the recommender system regarding the redesign and/or reconfiguration.

9. A computer-implemented method for providing improvements for a user interface (UI) controlling unit connected with a workflow system within a multi-user system, said method comprising:

gathering data concerning resource usage in the workflow system caused by the UI controlling unit via a user interaction of a user with the UI controlling unit, wherein the UI controlling unit is selected from the group consisting of a specific graphical user interface (GUI) control on a computer screen and a specific physical haptic control;

measuring an effect of the user interaction regarding the resource usage in the workflow system, wherein underlying command of the user interaction controls a current work step in the workflow system and/or initiates a subsequent work step in the workflow system; and providing at least one recommendation for improving implementation of the workflow presentation which is transformed into redesign and/or reconfiguration of the UI controlling unit to improve a functional utilization of the UI controlling unit for implementing one or more work steps in the workflow system, wherein the at least one recommendation is derived from the gathered data and from a technical quality of the workflow system's resource usage.

10. A method according to claim 9, wherein the gathered data also concern data of further resource usage within a distributed system.

11. A computer program product comprising one or more computer-readable storage media having stored thereon instructions which, upon being executed by one or more processors, cause the one or more processors to carry out the method of claim 9.

12. The recommender system according to claim 1, wherein the technical quality depends on the measured effect in relation to at least one predefined requirement and/or brought about workflow simulation.

13. The recommender system according to claim 1, wherein the gathered data includes feedback from the user of (i) an exhaustion level of the user caused by the user interaction with the UI controlling unit and (ii) a level of contentment of the user with the UI controlling unit.

* * * * *